United States Patent
Baron et al.

(10) Patent No.: US 9,727,274 B2
(45) Date of Patent: Aug. 8, 2017

(54) CLONING LIVE VIRTUAL MACHINES

(71) Applicants: Ayal Baron, Kiryat Ono (IL); Federico Simoncelli, Fano (IT)

(72) Inventors: Ayal Baron, Kiryat Ono (IL); Federico Simoncelli, Fano (IT)

(73) Assignee: Red Hat Israel, Ltd., Raanana (IL)

( * ) Notice: Subject to any disclaimer, the term of this patent is extended or adjusted under 35 U.S.C. 154(b) by 229 days.

(21) Appl. No.: 13/777,892

(22) Filed: Feb. 26, 2013

(65) Prior Publication Data
US 2014/0244950 A1    Aug. 28, 2014

(51) Int. Cl.
*G06F 3/06* (2006.01)
*G06F 9/455* (2006.01)

(52) U.S. Cl.
CPC ............ *G06F 3/065* (2013.01); *G06F 3/0605* (2013.01); *G06F 3/067* (2013.01); *G06F 3/0611* (2013.01); *G06F 3/0662* (2013.01); *G06F 9/45558* (2013.01); *G06F 2009/45562* (2013.01)

(58) Field of Classification Search
CPC ....... G06F 2009/45562; G06F 11/2056; G06F 11/2064; G06F 11/1446; G06F 3/0662; G06F 9/45533; G06F 2201/84
USPC .............................................. 711/162; 718/1
See application file for complete search history.

(56) References Cited

U.S. PATENT DOCUMENTS

| | | | | |
|---|---|---|---|---|
| 7,761,573 B2* | 7/2010 | Travostino | ............ | G06F 9/4856 709/226 |
| 8,135,674 B2* | 3/2012 | Wu | ..................... | G06F 11/1458 707/639 |
| 8,151,263 B1* | 4/2012 | Venkitachalam | ....... | G06F 9/485 711/162 |
| 8,336,046 B2* | 12/2012 | Bowman | ............... | G06F 9/4843 718/1 |
| 2011/0010515 A1* | 1/2011 | Ranade | ............... | G06F 11/1451 711/162 |

* cited by examiner

*Primary Examiner* — Ann J Lo
*Assistant Examiner* — Tracy A Warren
(74) *Attorney, Agent, or Firm* — Lowenstein Sandler LLP

(57) ABSTRACT

A system and method are disclosed for cloning a live virtual machine (i.e., a virtual machine that is running). In accordance with one example, a computer system prepares an area of a storage device for a clone of a live virtual machine, and a transaction is then executed that comprises: creating the clone of the live virtual machine based on a live snapshot of the live virtual machine, copying the clone to the area of the storage device, and mirroring a change to a virtual disk of the live virtual machine that occurs after the live snapshot is created, wherein the mirroring is via one or more write operations to the virtual disk and to a replica of the virtual disk associated with the clone.

17 Claims, 5 Drawing Sheets

CLONING LIVE VIRTUAL MACHINES

TECHNICAL FIELD

This disclosure relates to computer systems, and more particularly, to cloning live virtual machines.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
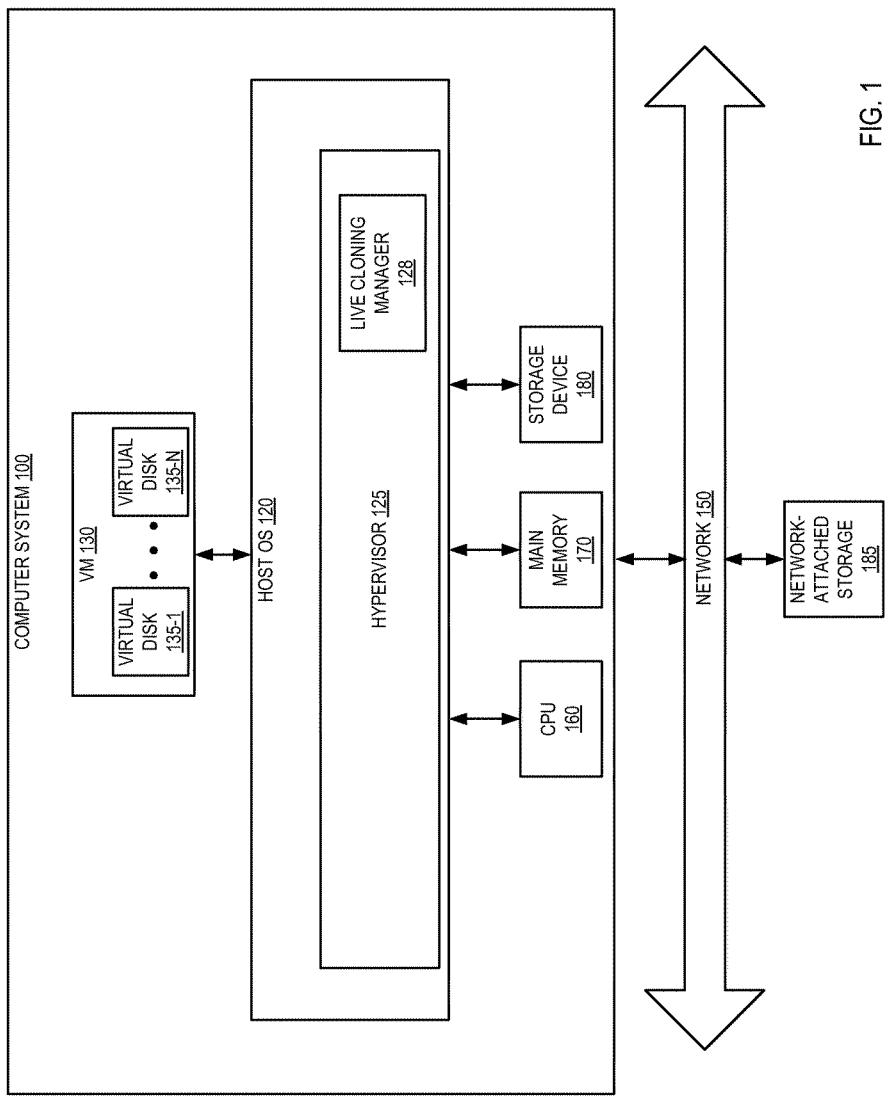
FIG. 1 depicts an illustrative system architecture, in accordance with the present disclosure.

Described herein is a system and method by which a computer system clones a live virtual machine (i.e., a virtual machine that is running). In order for cloning to be performed while a virtual machine is running, changes that occur to a virtual disk of the VM during the cloning process (e.g., write operations to the virtual disk, formatting commands for the virtual disk, etc.) should be properly captured in the clone, or else there could be inconsistencies between the original VM and the clone.

In accordance with one example, cloning is performed using live snapshots. A snapshot of a virtual disk of a VM is a file that captures the state of the virtual disk at a particular point in time, and a live snapshot of a virtual disk of a VM is a snapshot that is taken while the VM is running (i.e., a snapshot that is taken without first shutting down the VM).

In accordance with one embodiment, a computer system prepares an area of a storage device (e.g., a magnetic hard disk, a Universal Serial Bus [USB] solid state drive, a Redundant Array of Independent Disks [RAID] system, a network attached storage [NAS] array, etc.) for a clone of a live virtual machine, and a transaction is then executed that comprises: creating the clone of the live virtual machine based on a live snapshot of the live virtual machine; copying the clone to the area of the storage device; and mirroring a change to a virtual disk of the live virtual machine that occurs after the live snapshot is created, where the mirroring is via one or more write operations to the virtual disk and to a replica of the virtual disk associated with the clone. In one example, the creation of the clone, the copying of the clone, and the mirroring portion of the transaction may be executed concurrently (e.g., by a first process that creates the clone, by a second process that copies the clone to the prepared area of the storage device, and by a third process that performs the mirroring), and the mirroring itself may be performed by multiple processes (e.g., a first process performing write operations corresponding to updates of a first virtual disk of the VM, a second process performing write operations corresponding to updates of a second virtual disk of the VM, etc.).

If the transaction executes successfully, a result is returned that indicates that the clone of the live virtual machine was successfully created with an up-to-date state (i.e., that updates to virtual disk(s) of the live VM during the transaction were successfully captured in the clone). Otherwise, in one example, if the transaction does not execute successfully (i.e., any of the clone creation, copying, or mirroring failed), the clone is deleted from main memory (if the clone was in fact created) and from the prepared area of the storage device (if the clone was in fact copied to the prepared area), and a result is returned indicating that the cloning failed. In another example, when the mirroring portion of the transaction fails, but both the clone creation and copying to storage were successfully executed during the failed transaction, the write operation(s) of the mirroring are rolled back, and a result is returned that indicates that a clone of the live VM was successfully created and stored in the prepared area of the storage device, but the clone is not completely up-to-date (i.e., any updates to virtual disk(s) of the VM during the cloning were not captured in the clone). In yet another example where the clone creation and copying to storage are successful but the mirroring portion of the transaction fails, no rollback is performed, and, as in the previous example above, a result is returned that indicates that a clone of the live VM was successfully created and stored in the prepared area of the storage device, but the clone is not completely up-to-date.

The techniques of the present disclosure can thus enable a computer system to clone a virtual machine without requiring shutdown of the virtual machine, and, when desired, guarantee that any updates to virtual disk(s) of the VM during the cloning are captured in the clone. The ability to perform such live cloning can facilitate administrative tasks such as upgrading storage, performing maintenance activities, backups, and so forth, as well as performance-enhancing features such as replication and load balancing.

FIG. 1 depicts an illustrative architecture of a computer system 100, in accordance with an example of the present invention. It should be noted that other architectures for computer system 100 are possible, and that examples of a system utilizing the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, storage device 180 (e.g., a magnetic hard disk, a Universal Serial Bus [USB] solid state drive, etc.), and network-attached storage device 185. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120 that manages the hardware resources of the computer system and provides functions such as interprocess communication, scheduling, virtual memory management, and so forth. In one example, host operating system 120 also comprises a hypervisor 125, which provides a virtual operating platform for virtual machines and manages their execution.

As shown in FIG. 1, computer system hosts a virtual machine 130, which is a software implementation of a machine that executes programs as though it were an actual physical machine. Virtual machine 130 comprises virtual disk(s) 135-1 through 135-N that are mapped to a storage device (e.g., storage device 180, network-attached storage device 185, etc.), where N is a positive integer. Virtual machine 130 also comprises a guest operating system (not depicted in FIG. 1) that manages files and programs within the virtual machine, as well as a virtual processor (also not depicted in FIG. 1) that is mapped by hypervisor 125 to physical CPU 160 of computer system 100. It should be noted that although, for simplicity, a single virtual machine 130 is depicted in FIG. 1, in some other examples computer system 100 may host a plurality of virtual machines.

In accordance with one example, hypervisor 125 includes a live cloning manager 128 that is capable of: preparing an area of a storage device for a clone of a live virtual machine; creating live snapshots of a live virtual machine; creating a clone of a live virtual machine based on a live snapshot of the live virtual machine; copying the clone to a prepared area of a storage device; and mirroring changes to a live VM's virtual disks to a clone of the live VM. Some operations of live cloning manager 128 are described in detail below with respect to FIGS. 2 through 4.

It should be noted that in some alternative examples, hypervisor 125 may be external to host OS 120, rather than embedded within host OS 120. It should further be noted that in some alternative examples, live cloning manager 128 may be a module of host OS 120, rather than a module of hypervisor 125.

Figure 2:
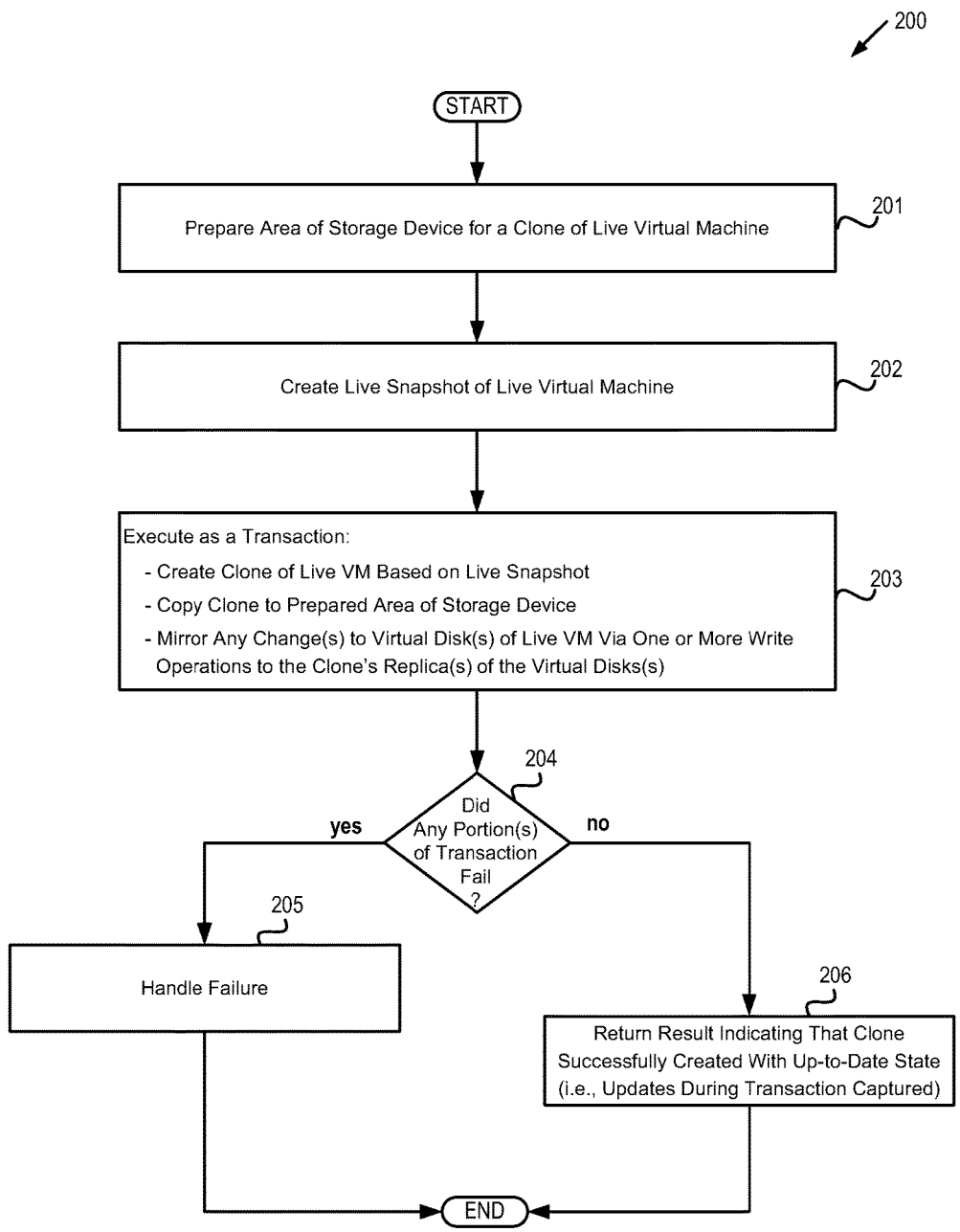
FIG. 2 depicts a flow diagram of one example of a method by which a computer system clones a live virtual machine.

FIG. 2 depicts a flow diagram of one example of a method 200 for cloning a live virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine.

At block 201, an area of a storage device (e.g., storage device 180, network-attached storage device 185, etc.) is prepared for a clone of live virtual machine 130. In one example, the preparation is performed by live cloning manager 128 and comprises allocating and initializing the storage area. It should be noted that the storage device may be either a network-attached storage device (e.g., network-attached storage device 185, etc.) or a storage device local to computer system 100 (e.g., storage device 180, etc.).

At block 202, a live snapshot of virtual machine 130 is created (e.g., by creating a full copy of the contents of VM, including the contents of virtual disks 135-1 through 135-N, etc.). In some embodiments, block 202 may be performed in response to an administrator submitting a command to computer system 100 (e.g., via a graphical user interface [GUI], etc.) to clone virtual machine 130, while in some other embodiments, block 202 may be performed as part of a scheduled job to clone virtual machine 130, while in yet other embodiments, block 202 may be performed in response to some other event or activity (e.g., maintenance, backup, etc.).

In one example, when a storage device of computer system 100 (e.g., storage device 180, network-attached storage device 185, etc.) supports native snapshotting (e.g., a capability by which the storage device can create snapshots), the live cloning manager 128 issues a request (e.g., a dedicated command, etc.) to a native snapshotting module on the storage device to create the snapshot. Alternatively (e.g., when none of the storage devices have a native snapshotting capability, etc.), the live cloning manager 128 may issue a request to hypervisor 125 or host OS 120 to create the snapshot. In one example, live cloning manager 128 may issue a query to one or more storage devices to determine whether there is a storage device that supports native snapshotting. In another example, live cloning manager 128 may obtain this information from hypervisor 125 or host OS 120.

At block 203 a transaction is executed, where the transaction comprises:

creating a clone of live VM 130 based on the live snapshot created at block 202;

copying the clone to the storage device area prepared at block 201; and mirroring any change(s) to virtual disk(s) 135-1 through 135-N of live VM 130 since the creation of the live snapshot, where the mirroring is via one or more write operations to the clone's replica(s) of virtual disk(s) 135-1 through 135-N.

In one example, the clone creation, clone copying, and mirroring of the transaction may be executed concurrently (e.g., by a first process that creates the clone, by a second process that copies the clone to the prepared area of the storage device, and by a third process that performs the mirroring). In addition, the mirroring portion of the transaction may itself be performed by multiple processes (e.g., a first process performing write operations corresponding to updates of virtual disk 135-1, a second process performing write operations corresponding to updates of virtual disk 135-2, etc.). In accordance with one example, the transaction is executed by live cloning manager 128.

In one example, the mirroring is performed via a single write operation that performs the mirroring with respect to all of the virtual disk(s) 135-1 through 135-N, while in another example, when there are a plurality of virtual disks (i.e., N>1), the mirroring is performed via a plurality of write operations (executed either sequentially or concurrently), each mirroring corresponding to a respective virtual disk and mirroring change(s) to that particular virtual disk, while in yet another example, the mirroring is performed via a plurality of write operations (executed either sequentially or in part concurrently), each corresponding to a single update of a single virtual disk (e.g., a first write operation that corresponds to a first update of virtual disk 135-1, a second write operation that corresponds to a second update of virtual disk 135-1, a third write operation that corresponds to a first update of virtual disk 135-2, etc.). It should be noted that in some alternative examples, when the live snapshotting and the mirroring are not executed as a part of a transaction, and are not atomic operations, hypervisor 125 may synchronize any small amounts of data that may have slipped between the live snapshot and mirroring commands.

Block 204 checks whether any portion(s) of the transaction failed (e.g., failure of the clone creation, failure of the copying, failure of at least one of the write operation(s) performed in the mirroring, etc.). If any such failure was detected, execution proceeds to block 205, otherwise execution proceeds to block 206.

At block 205, the transaction failure is handled. One example method for handling the failure is described in detail below with respect to FIG. 3, while another example method for handling the failure is described in detail below with respect to FIG. 4. At block 206, which is reached when the transaction executed successfully, a result is returned that indicates that the clone of live VM 130 was successfully created with an up-to-date state (i.e., that updates to live VM 130 during the transaction were successfully captured in the clone).

Figure 3:
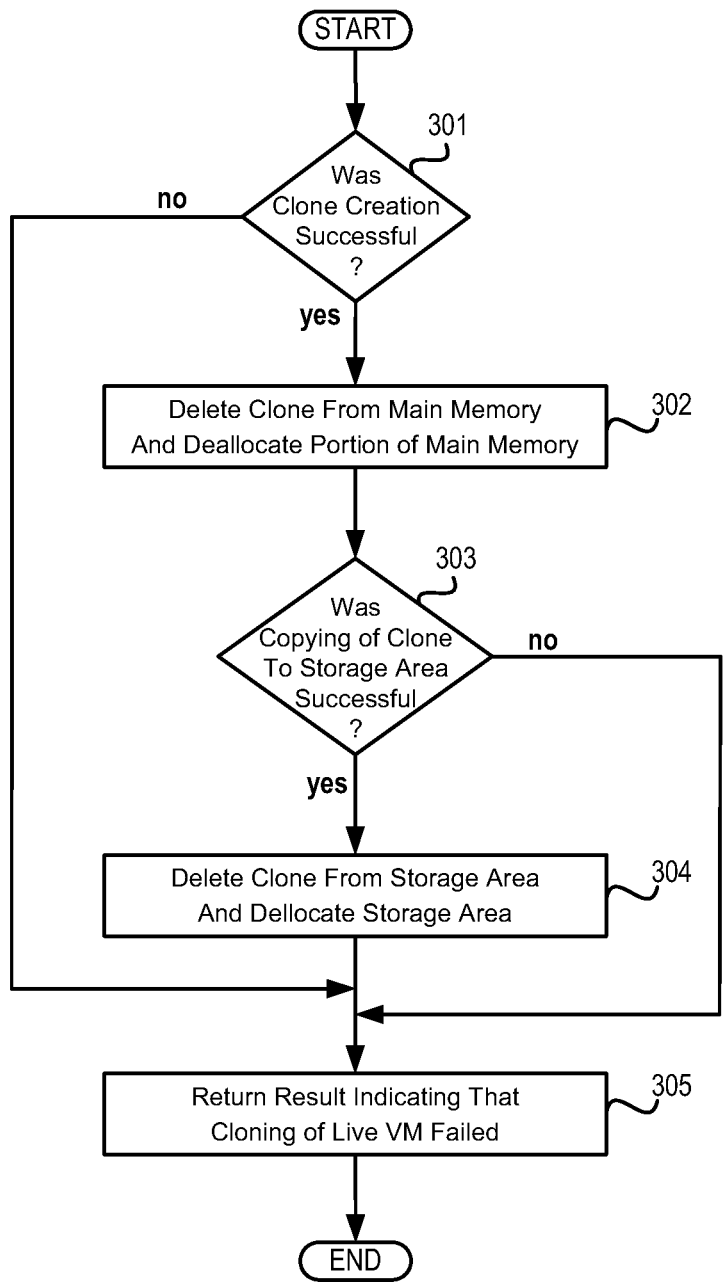
FIG. 3 depicts a flow diagram of an example of a first method by which a computer system handles a failure during cloning of a live virtual machine.

FIG. 3 depicts a flow diagram of an example of a first method by which a computer system handles a failure during cloning of a live virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine.

Block 301 checks whether the creation of the clone of live VM 130 during the execution of the transaction of block 203 was successful. If so, execution proceeds to block 302, otherwise execution continues at block 305.

At block 302, the clone of live VM 130 is deleted from main memory and the portion of main memory occupied by the clone is deallocated, thereby enabling the memory to be used for a subsequent live cloning operation or any other type of storage. It should be noted that in some examples (e.g., when the cloning is of virtual disks of live VM 130, but not of the entire virtual machine), block 302 may be optional.

Block 303 checks whether the copying of the clone to the prepared area of the storage device during the execution of the transaction of block 203 was successful. If so, execution proceeds to block 304, otherwise execution continues at block 305.

When block 304 is reached, which indicates that the failure occurred during the mirroring portion of the transaction executed at block 203, the clone is deleted from the prepared area of the storage device, and the prepared area is deallocated, thereby enabling the area to be used for a subsequent live cloning operation or any other type of storage. At block 305, a result is returned that indicates that the attempted cloning of live VM 130 failed.

Figure 4:
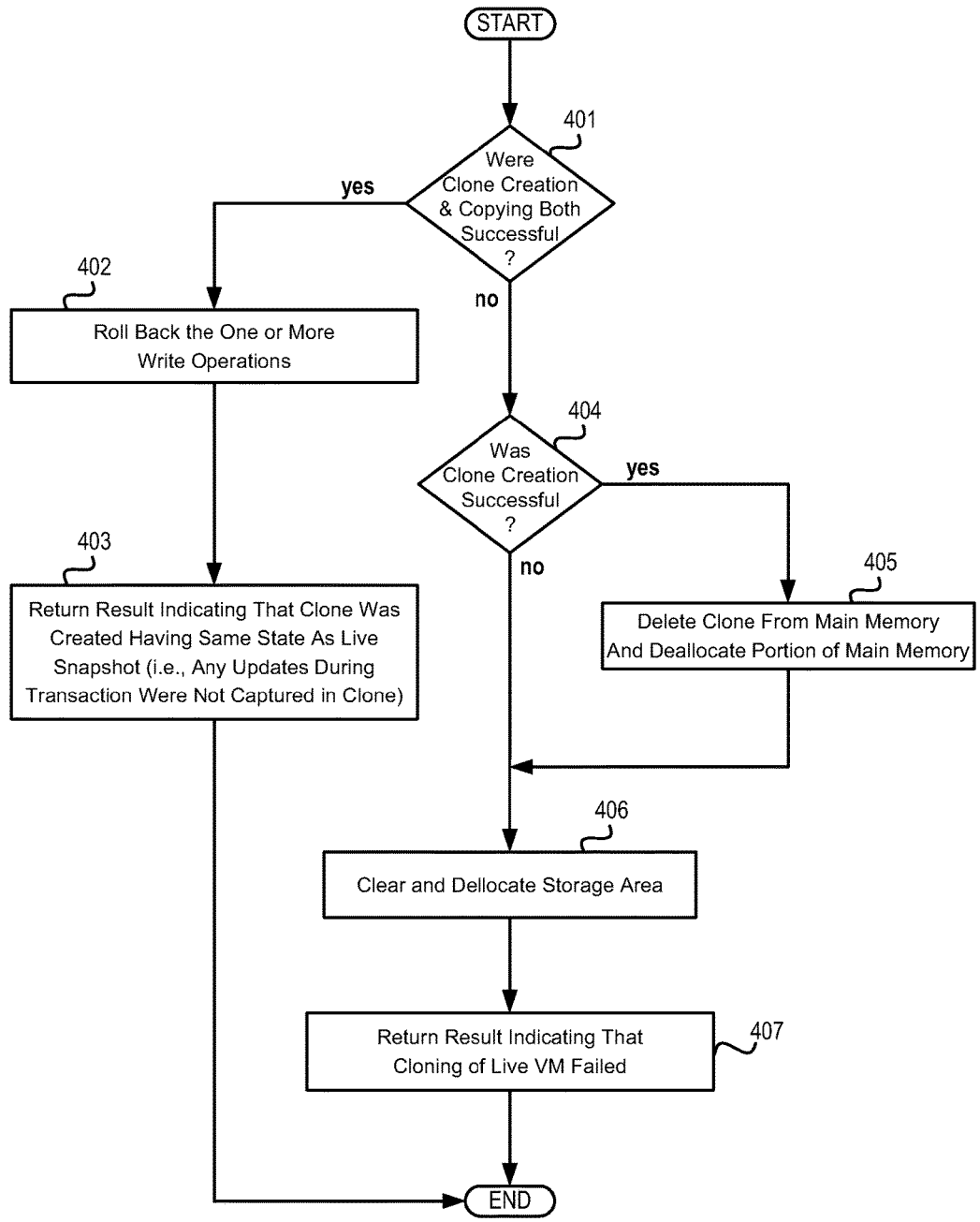
FIG. 4 depicts a flow diagram of an example of a second method by which a computer system handles a failure during cloning of a live virtual machine.

FIG. 4 depicts a flow diagram of an example of a second method by which a computer system handles a failure during cloning of a live virtual machine. The method is performed by processing logic that may comprise hardware (circuitry, dedicated logic, etc.), software (such as is run on a general purpose computer system or a dedicated machine), or a combination of both. In one example, the method is performed by the computer system 100 of FIG. 1, while in some other examples, some or all of the method might be performed by another machine.

Block 401 checks whether both the creation of the clone of live VM 130 and the copying of the clone to the prepared area of the storage device during the execution of the transaction of block 203 were successful. If so (which indicates that the failure occurred during the mirroring portion of the transaction executed at block 203), execution proceeds to block 402; otherwise, execution continues at block 404.

At block 402, the one or more write operations of the mirroring portion of the transaction of block 203 are rolled back. It should be noted that in some examples, block 402 may be optional. For example, when the disks are not quiesced as part of the live snapshotting, or in situations when crash consistency is the only imperative, the rollback may be omitted. In contrast, when the disks are quiesced as part of the live snapshotting, then the rollback may make sense, as the file system would be consistent.

At block 403, a result is returned that indicates that:
a clone of live VM 130 was successfully created and stored in the prepared area of the storage device; and
the clone has the same state as the live snapshot (i.e., any updates to VM 130 that may have occurred during the cloning are not captured in the clone; however, the clone has a consistent, if not completely-up-to-date, state).

Block 404 checks whether the creation of the clone of live VM 130 during the execution of the transaction of block 203 was successful. If so, execution proceeds to block 405, otherwise execution continues at block 406.

At block 405, the clone of live VM 130 is deleted from main memory and the portion of main memory occupied by the clone is deallocated, thereby enabling the portion of main memory to be used for a subsequent live cloning operation or any other purpose. Block 406 clears and deallocates the prepared area of the storage device, and at block 407 a result is returned that indicates that the attempted cloning of live VM 130 failed.

Figure 5:
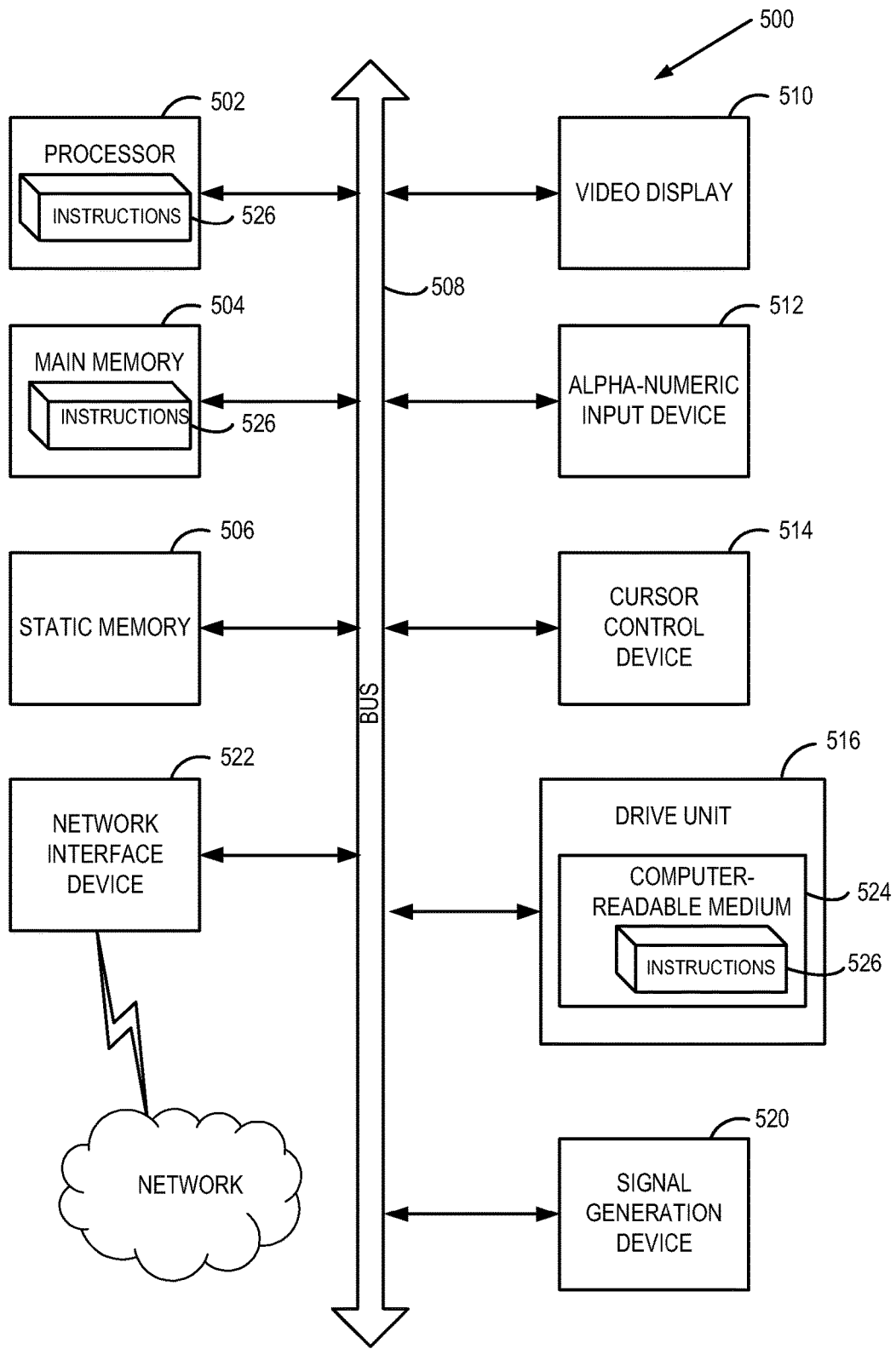
FIG. 5 depicts a block diagram of an illustrative computer system operating in accordance with examples of the invention.

FIG. 5 illustrates an illustrative computer system within which a set of instructions, for causing the machine to perform any one or more of the methodologies discussed herein, may be executed. In alternative examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 through 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "preparing", "executing", "storing", "copying", "mirroring", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other examples will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   allocating, by a processing device of a computer system comprising main memory, an area of a storage device for a clone of a live virtual machine running on the computer system by preventing the area from being used for storage and cloning operations other than for the clone of the live virtual machine, wherein the live virtual machine comprises a virtual disk;
   creating a live snapshot of the live virtual machine by copying the live virtual machine and the virtual disk; and
   executing, after the creating the live snapshot, a transaction, wherein the executing comprises:
      creating the clone of the live virtual machine on a portion of the main memory in view of the live snapshot of the live virtual machine, the clone comprising a replica of the virtual disk;
      copying the clone from the portion of the main memory to the area of the storage device; and
      mirroring a change to the virtual disk that occurs after the live snapshot is created, the change comprising a first write operation to the virtual disk, and the mirroring comprising performing a second write operation to the replica of the virtual disk to update the clone with the change, the second write operation corresponding to the change to the virtual disk.

2. The method of claim 1 further comprising detecting a failure in at least one of the creating the clone, the copying of the clone, or the mirroring.

3. The method of claim 2 further comprising deleting, in response to the detecting, the clone from the area of the storage device.

4. The method of claim 2 further comprising rolling back, in response to the detecting, the first and second write operations to the virtual disk and to the replica of the virtual disk, respectively.

5. The method of claim 1 further comprising initializing the area.

6. The method of claim 1 wherein the first write operation and the second write operation are concurrent.

7. The method of claim 1 wherein the copying and the mirroring are executed concurrently.

8. An apparatus comprising:
   a memory to store a live virtual machine comprising a virtual disk; and
   a processing device, operatively coupled to the memory, to:
      allocate an area of a storage device for a clone of the live virtual machine running on the apparatus by preventing the area from being used for storage and cloning operations other than for the clone of the live virtual machine;
      create a live snapshot of the live virtual machine by copying the live virtual machine and the virtual disk; and
      execute, after the live snapshot is created, a transaction, wherein to execute, the processing device is to:
         create the clone of the live virtual machine on a portion of the memory in view of the live snapshot of the live virtual machine, the clone comprising a replica of the virtual disk;
         copy the clone from the portion of the memory to the area of the storage device; and
         mirror a change to the virtual disk that occurs after the live snapshot is created, the change comprising a first write operation to the virtual disk, wherein to mirror, the processing device is to perform a second write operation to the replica of the virtual disk to update the clone with the change, the second write operation corresponding to the change to the virtual disk.

9. The apparatus of claim 8 wherein the processing device is further to detect a failure in at least one of the creation of the clone, the copying of the clone, or the mirroring.

10. The apparatus of claim 9 wherein the processing device is further to delete, in response to the detecting, the clone from the area of the storage device.

11. The apparatus of claim 9 wherein the processing device is further to roll back, in response to the detecting, the first and second write operations to the virtual disk and to the replica of the virtual disk, respectively.

12. The apparatus of claim 8 wherein the first write operation and the second write operation are concurrent.

13. The apparatus of claim 8 wherein the copying and the mirroring are executed concurrently.

14. A non-transitory computer readable storage medium, having instructions stored therein, which when executed, cause a processing device to:
   allocate, by the processing device of a computer system comprising main memory, an area of a storage device for a clone of a live virtual machine running on the computer system by preventing the area from being used for storage and cloning operations other than for the clone of the live virtual machine, wherein the live virtual machine comprises a virtual disk;
   creating a live snapshot of the live virtual machine by copying the live virtual machine and the virtual disk; and
   execute, after the creating the live snapshot, a transaction, wherein to execute, the processing device is to:
      create the clone of the live virtual machine on a portion of the main memory in view of the live snapshot of the live virtual machine, the clone comprising a replica of the virtual disk;
      copy the clone from the portion of the main memory to the area of the storage device; and
      mirror a change to the virtual disk that occurs after the live snapshot is created, the change comprising a first write operation to the virtual disk, wherein to mirror, the processing device is to perform a second write operation to the replica of the virtual disk to update the clone with the change, the second write operation corresponding to the change to the virtual disk.

15. The non-transitory computer readable storage medium of claim 14 wherein the processing device is further to detect a failure in at least one of the creation of the clone, the copying of the clone, or the mirroring.

16. The non-transitory computer readable storage medium of claim 15 wherein the processing device is further to delete, in response to the detection of the failure, the clone from the area of the storage device.

17. The non-transitory computer readable storage medium of claim 15 wherein the processing device is further to roll back, in response to the detection of the failure, the first and second write operations to the virtual disk and to the replica of the virtual disk.

* * * * *